United States Patent
Kite et al.

(10) Patent No.: US 10,405,015 B2
(45) Date of Patent: Sep. 3, 2019

(54) REMOTE MEDIA ORDERING HUB

(75) Inventors: David Kenneth Kite, Los Angeles, CA (US); Edward Drake, Stevenson Ranch, CA (US); Bruce Hogan Bleasdale, Granada Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 351 days.

(21) Appl. No.: 13/531,574

(22) Filed: Jun. 24, 2012

(65) Prior Publication Data

US 2013/0347014 A1    Dec. 26, 2013

(51) Int. Cl.
| | |
|---|---|
| *H04N 21/239* | (2011.01) |
| *H04N 21/258* | (2011.01) |
| *H04N 21/2665* | (2011.01) |
| *H04N 21/472* | (2011.01) |
| *H04N 21/2543* | (2011.01) |

(52) U.S. Cl.
CPC ... *H04N 21/2393* (2013.01); *H04N 21/25875* (2013.01); *H04N 21/2665* (2013.01); *H04N 21/47202* (2013.01); *H04N 21/2543* (2013.01)

(58) Field of Classification Search
CPC ......... H04N 21/2393; H04N 21/25875; H04N 21/2665; H04N 21/2543
USPC .............................................. 725/4–5, 45–46
See application file for complete search history.

(56) References Cited

U.S. PATENT DOCUMENTS

| | | | |
|---|---|---|---|
| 7,124,093 B1 * | 10/2006 | Graham ................. | G06Q 30/02 705/14.41 |
| 8,584,165 B1 * | 11/2013 | Kane et al. ...................... | 725/44 |
| 2008/0229354 A1 * | 9/2008 | Morris ............... | H04N 7/17318 725/34 |
| 2008/0271078 A1 * | 10/2008 | Gossweiler et al. ............ | 725/40 |
| 2009/0133059 A1 * | 5/2009 | Gibbs et al. .................... | 725/34 |

* cited by examiner

*Primary Examiner* — Kunal Langhnoja
(74) *Attorney, Agent, or Firm* — Patent Ingenuity, P.C.; Samuel K. Simpson (57) ABSTRACT

A media ordering hub receives a request for media content. Further, the media ordering hub provides a plurality of multichannel video programming distributors that offer the media content. In addition, the media ordering hub determines a selected multichannel video programming distributor from the plurality of multichannel video programming distributors. The media ordering hub also authenticates login credentials to access the selected multichannel video programming distributor so that the selected multichannel video programming distributor delivers the media content.

20 Claims, 6 Drawing Sheets

REMOTE MEDIA ORDERING HUB

BACKGROUND

1. Field

This disclosure generally relates to the field of data content. More particularly, the disclosure relates to the ordering of data content.

2. General Background

Current multichannel video programming distributors ("MVPDs"), e.g. cable and satellite service providers, offer pay per view ("PPV") and video on demand ("VOD") services. These services may typically be ordered by the consumer via the MVPD's program guide on the television. Program guides and other television interfaces that utilize a remote control make the searching and ordering process cumbersome. Moreover, consumers frequently experience "sticker shock" when their bill arrives with an amount larger than what was expected as a result of incremental charges incurred from ordering movies.

SUMMARY

In one aspect of the disclosure, a computer program product is provided. The computer program product includes a computer readable medium having a computer readable program stored thereon. The computer readable program when executed on a computer causes the computer to receive, at a media ordering hub, a request for media content. Further, the computer readable program when executed on the computer causes the computer to provide, from the media ordering hub, a plurality of multichannel video programming distributors that offer the media content. In addition, the computer readable program when executed on the computer causes the computer to determine, at the media ordering hub, a selected multichannel video programming distributor from the plurality of multichannel video programming distributors. The computer readable program when executed on the computer also causes the computer to authenticate, at the media ordering hub, login credentials to access the selected multichannel video programming distributor so that the selected multichannel video programming distributor delivers the media content.

In another aspect of the disclosure, a process is provided. The process receives, at a media ordering hub, a request for media content. Further, the process provides, from the media ordering hub, a plurality of multichannel video programming distributors that offer the media content. In addition, the process receives, at the media ordering hub, a selected multichannel video programming distributor from the plurality of multichannel video programming distributors. The process also authenticates, at the media ordering hub, login credentials to access the selected multichannel video programming distributor so that the selected multichannel video programming distributor delivers the media content.

In yet another aspect of the disclosure, a system is provided. The system includes a processor that is configured to receive, at a media ordering hub, a request for media content, provide, from the media ordering hub, a plurality of multichannel video programming distributors that offer the media content, determine, at the media ordering hub, a selected multichannel video programming distributor from the plurality of multichannel video programming distributors, and authenticate, at the media ordering hub, login credentials to access the selected multichannel video programming distributor so that the selected multichannel video programming distributor delivers the media content.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A media ordering hub may be utilized to provide an enhanced method of ordering media content. In one aspect, embeddable code may be included within a web page, online advertisement, an application, or the like. An example of an application is an application that is installed on a mobile device. Applications installed on other devices may also be utilized. Further, the embeddable code may be hosted on one or more remote servers. The embeddable code may be utilized to provide information about media content that is available for purchase to a computing device of a customer. For example, the embeddable code may be utilized to present a user with a ten minute preview of a movie. After conclusion of the preview, the user may be provided with the opportunity to rent or purchase the movie.

In one aspect, the embeddable code is contextually placed. For example, embeddable code for an action movie may be contextually placed on a website about a different action movie that has a similar type of storyline. Accordingly, the user may contextually discover media content rather than having to search through a cumbersome program guide for the media content. In other words, a user may contextually discover embeddable code for media content of possible interest rather than having to perform a cumbersome search of the website or the program guide of an MVPD.

In another aspect, the embeddable code allows the user to select the MVPD. For example, a user may be a subscriber of an MVPD. The user may then select that MVPD. The media ordering hub may receive that selection and coordinate authentication of the user with the particular MVPD. The media ordering hub may then provide the media content to the user after payment is authorized by the user. Accordingly, the media ordering hub is in operable communication with a plurality of MVPDs. As a result, a user does not have to be concerned with going to a website, portal, or program guide of the MVPD. The user may start with the content that is contextually discovered and then order through the embeddable code via the media ordering hub. In yet another aspect, the embeddable code allows a user that is not a subscriber of the MVPD or is a subscriber of a different MVPD to place an order for the media content with the particular MVPD.

In contrast with the current payment model that bills media content directly to the bill of a subscriber of the MVPD, the media ordering hub may allow a user to select from a variety of different payment options. For example, the media ordering hub may allow a user to pay for the media content by credit card, debit card, virtual currency, coupon, voucher, or the like. The media ordering hub may also allow the user to pay for the media content by having the MVPD bill the user directly for the media content.

The term media content is intended herein to include movies, applications, games, audio files, or the like. Although the media ordering hub facilitates the ordering of the media content, the MVPD may provide the media content directly to the user after purchase.

The user may watch the media content on any device supported by the MVPD. For example, the user may order the media content on a personal computer ("PC") and watch the media content on a television. The user may also order and watch the media content on the same device. For example, a user may order the media content on a tablet device and then watch the media content immediately after purchase on the tablet device. A variety of computing devices may be utilized to order and/or watch the media content. The computing device may be a PC, laptop, smartphone, tablet device, set top box, or the like.

Figure 1:
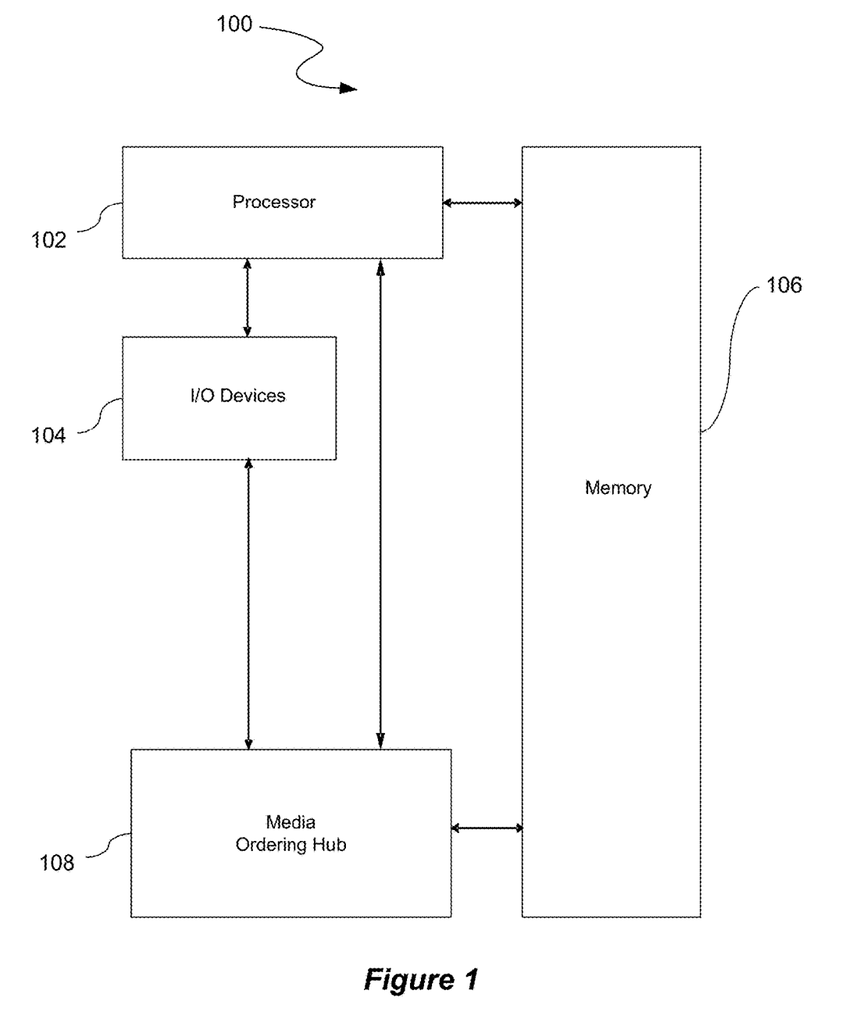
FIG. 1 illustrates a system that may be utilized to perform ordering of media content.

FIG. 1 illustrates a system 100 that may be utilized to perform ordering of media content. In one aspect, the system 100 is implemented utilizing a general purpose computer or any other hardware equivalents. Thus, the system 100 comprises a processor 102, a memory 106, e.g., random access memory ("RAM") and/or read only memory (ROM), a media ordering hub 108 that performs the ordering of the media content, and various input/output devices 104, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)). In one aspect, the media ordering hub 108 is implemented as a module. Various other configurations for the media ordering hub 108 may be utilized.

It should be understood that the media ordering hub 108 may be implemented as one or more physical devices that are coupled to the processor 102. For example, the media ordering hub 108 may include a plurality of modules. Alternatively, the media ordering hub 108 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor 102 in the memory 106 of the system 100. As such, the media ordering hub 108 (including associated data structures) of the present disclosure may be stored on a computer readable medium, e.g., RAM memory, magnetic or optical drive or diskette and the like.

The system 100 may be utilized to implement any of the configurations herein. In another aspect, the processor 102 is the media ordering hub 108. Accordingly, in such an aspect, a media ordering hub 108 that is separate from the processor 102 is unnecessary. FIG. 1 provides an example of an implementation of a media ordering system. However, the media ordering system is not limited to any particular model and may be implemented with similar and/or different components from this example.

Figure 2:
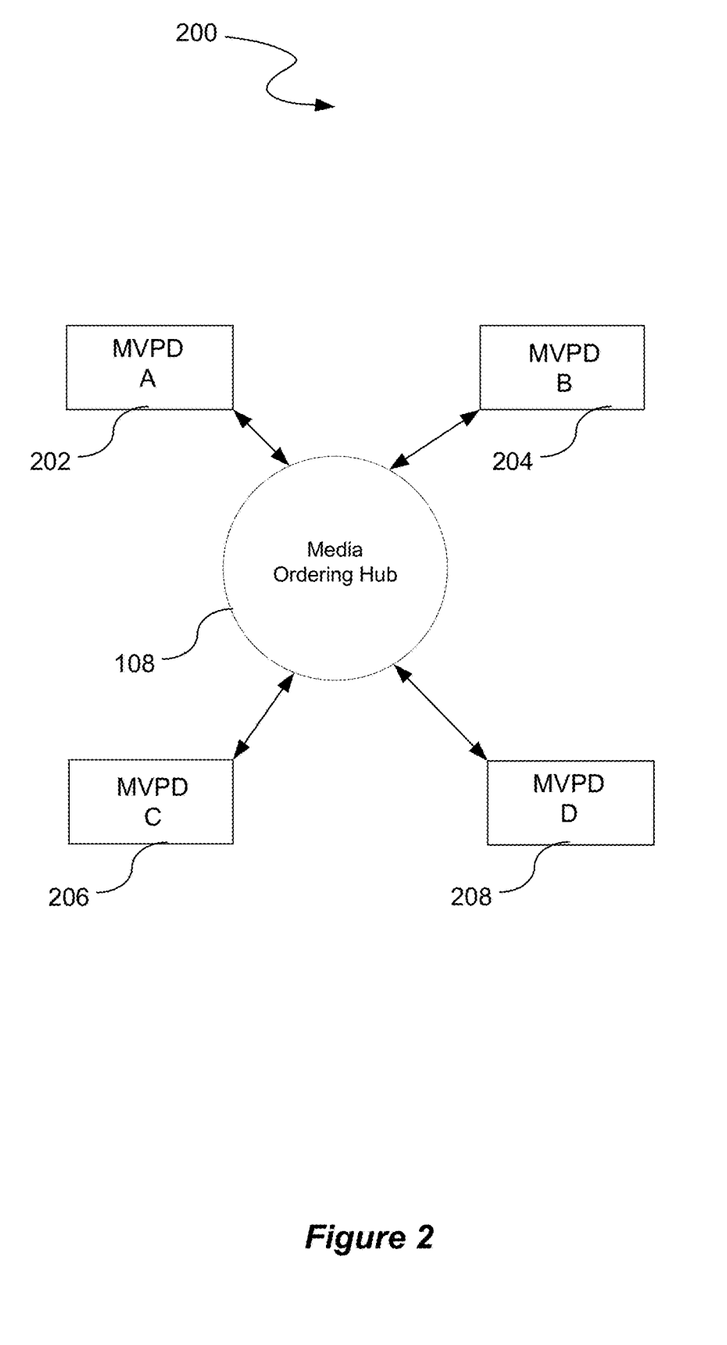
FIG. 2 illustrates a media ordering configuration.

The media ordering hub 108 of the system 100 illustrated in FIG. 1 may interact with various entities so that media content may be ordered by a user. FIG. 2 illustrates a media ordering configuration 200. In one aspect, the media ordering configuration 200 includes the media ordering hub 108 and a plurality of MVPDs. The media ordering hub 108 may interact with a plurality of different MVPDs. As an example, the media ordering hub 108 may interact with an MVPD A 202, an MVPD B 204, an MVPD C 206, and an MVPD D 208. The media ordering hub 108 has the flexibility to allow users that are subscribed to different MVPDs to order media content. Accordingly, the media ordering hub 108 may not know in advance which MVPD the user is subscribed to. Therefore, the media ordering hub 108 interacts with a plurality of different MVPDs and allows the user to select an MVPD from which to order media content.

In one aspect, the user does not have to select the MVPD as the media ordering hub 108 may be location aware. In other words, the media ordering hub 108 may have knowledge of the selected MVPD providing media content in a geographic location in which a user is situated.

Further, the media ordering hub 108 may act as an intermediary between the user and the selected MVPD. In other words, the user may provide login credentials to the media ordering hub 108. The media ordering hub 108 may then interact with the selected MVPD to authenticate the login credentials. Further, the media ordering hub 108 may provide various information regarding the order to the MVPD. For example, the user may select the name of the content, the format of the content, e.g., Standard Definition or High Definition, or the like.

Figure 3:
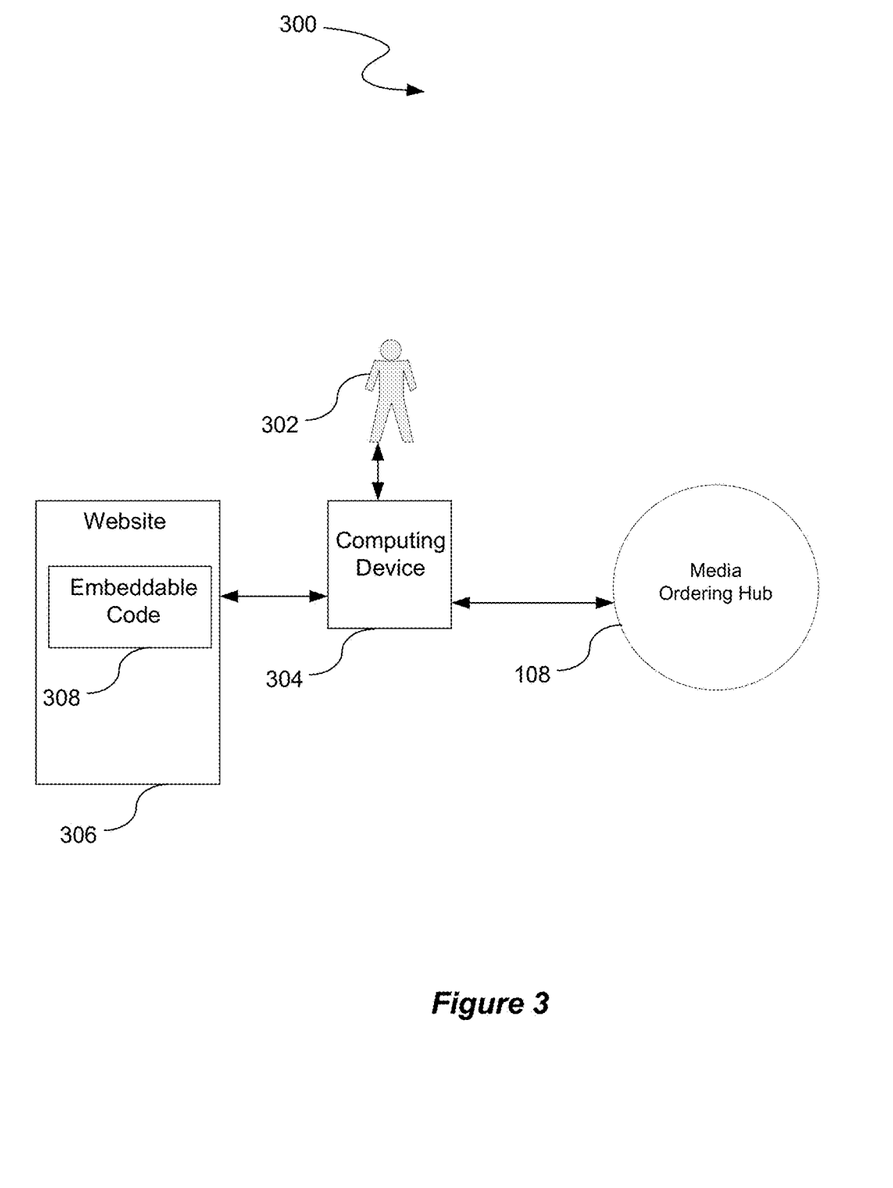
FIG. 3 illustrates a contextual discovery configuration

FIG. 3 illustrates a contextual discovery configuration 300. A user 302 may interact with a computing device 304. The user 302 may utilize the computing device 304 to interact with a website 306. For example, the website 306 may have a movie review of an action movie. In one aspect, the website 306 may have embeddable code 308. The embeddable code 308 may include instructions to provide information on the website 306 about a similar type of movie that is available for rent or purchase by the user 302. For example, the embeddable code 308 may include instructions for providing a ten minute movie preview of the similar type of movie. If the user is interested in purchasing the similar type of movie, the user may utilize the media ordering hub 108 to select the MVPD to which the user is a subscriber and purchase or rent the similar type of movie. The user may then be directed to the media ordering hub 108 to initiate a transaction. As an example, the media ordering hub 108 may be a website to which the user may be directed from the embeddable code 308 at the website 306.

Accordingly, the contextual discovery configuration 300 involves media content finding the user. The embeddable code 308 may be provided in a context that has some degree of similarity.

In contrast with current MVPD branded web portals that involve a user having to go through the cumbersome process of entering a particular MVPD website and searching through content, the contextual discovery configuration 300 attempts to place the embeddable code 308 in contextual locations where media content that may be of interest to the user finds the user. The website 306 is illustrated only as an example. Various other types of locations may be utilized for the embeddable code 308. For example, online advertisements, social networking platforms, co-branded websites, or the like may be utilized. Accordingly, the embeddable code 308 may be placed in browsing contexts that have large amounts of user traffic. Accordingly, a user does not have to go to a new web destination or search for media content.

Figure 4:
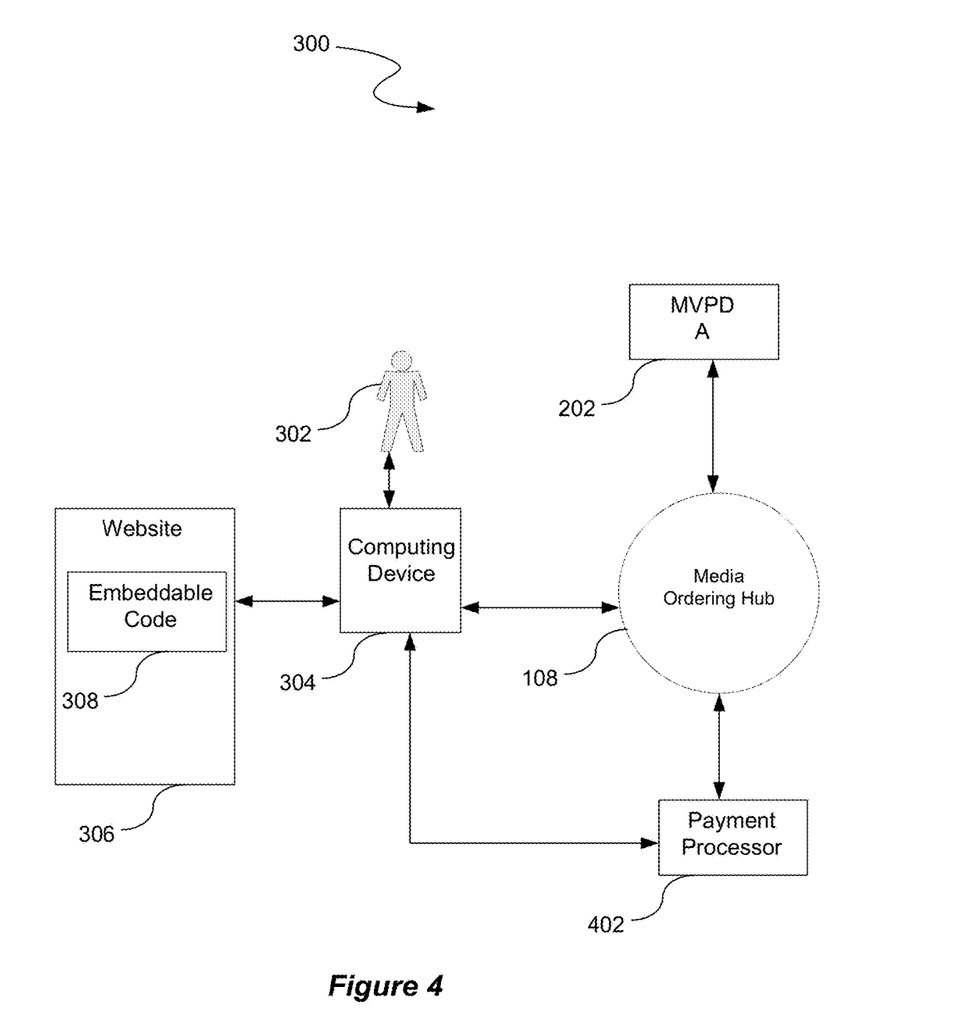
FIG. 4 illustrates an example of the contextual discovery configuration in which the user places an order for media content.

FIG. 4 illustrates an example of the contextual discovery configuration 300 in which the user 302 places an order for media content. As an example, the user 302 may provide an input to the media ordering hub 108 through the computing device 304 that the user 302 is a subscriber to the MVPD A 202 illustrated in FIG. 2. The media ordering hub 302 may then interact with the user 302 and the MVPD 202 to authenticate the login credentials of the user 302 and provide an order to the MVPD A 202 of the media content.

In one aspect, the media ordering hub 108 may then provide the user with a variety of payment options. For example, the media ordering hub 108 may provide a menu of payment options that may include a credit card payment, a debit card payment, a direct billing to the selected multichannel video programming distributor for subsequent payment, a virtual currency payment, a coupon payment, a voucher payment, or the like. The media ordering hub 108 may then coordinate with a payment processor 402 so that the user 302 may provide payment to the payment processor 402. In one aspect, the payment processor 402 is a different entity than that of the media ordering hub 108. In another aspect, the media ordering 108 hub performs the payment processing tasks of the payment processor 402 so that the payment processor 404 is unnecessary. In yet another aspect, the payment processor 402 is a selected MVPD such as the selected MVPD A 202.

Figure 5:
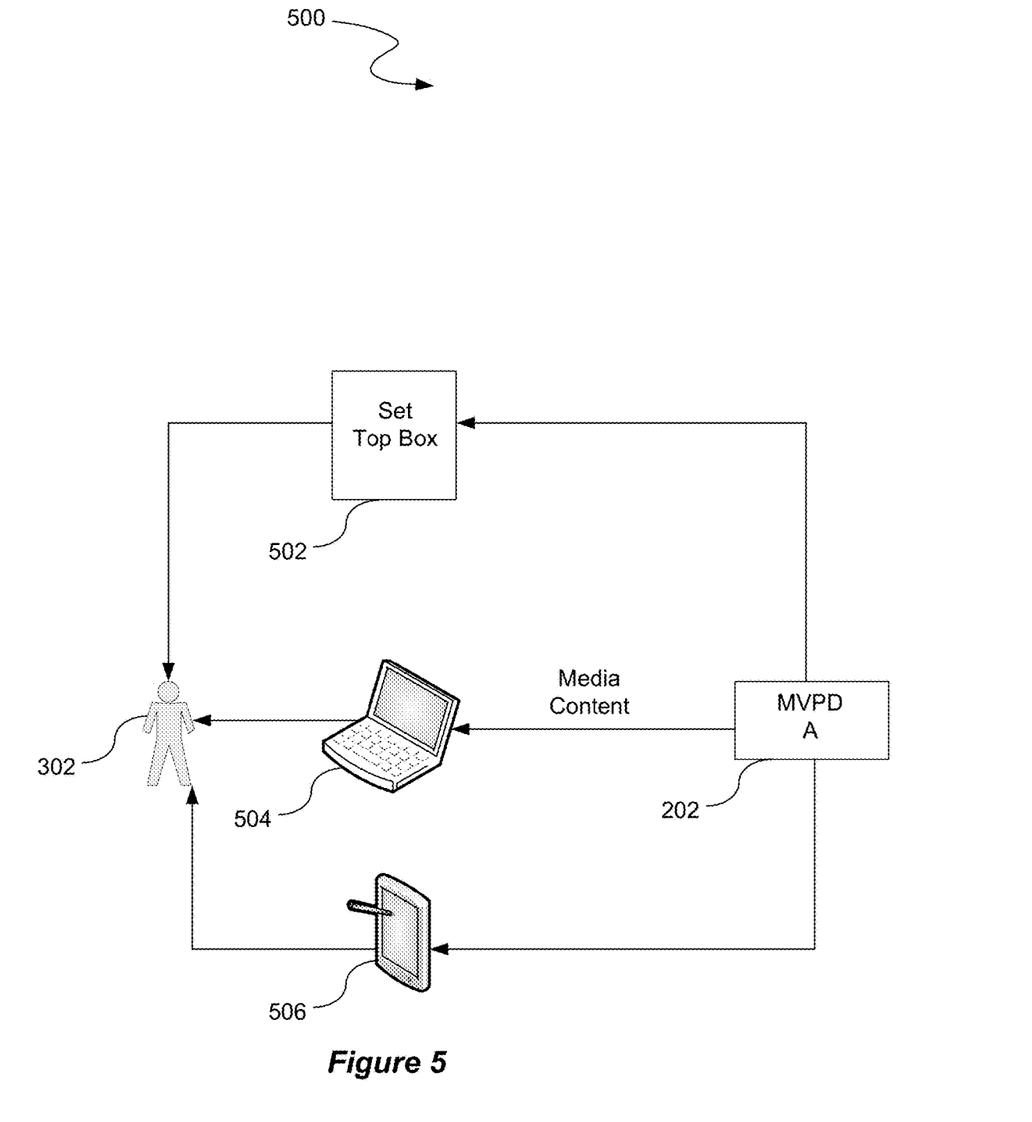
FIG. 5 illustrates a data delivery configuration that may be utilized to deliver the media content that is ordered through the media ordering hub as illustrated in FIG. 4.

FIG. 5 illustrates a data delivery configuration 500 that may be utilized to deliver the media content that is ordered through the media ordering hub 108 as illustrated in FIG. 4. As an example, the MVPD A 202 may support media content on a set top box 502, a laptop 504, and a tablet device 506. Accordingly, the user 302 may be able to watch the delivered media content on any of these devices. In one aspect, the selected MVPD delivers the content to the user 302. Although the media ordering hub 108 facilitates the ordering transaction between the user 302 and the selected MVPD, the selected MVPD may deliver the media content. In another aspect, the media ordering hub 108 may deliver the media content.

Figure 6:
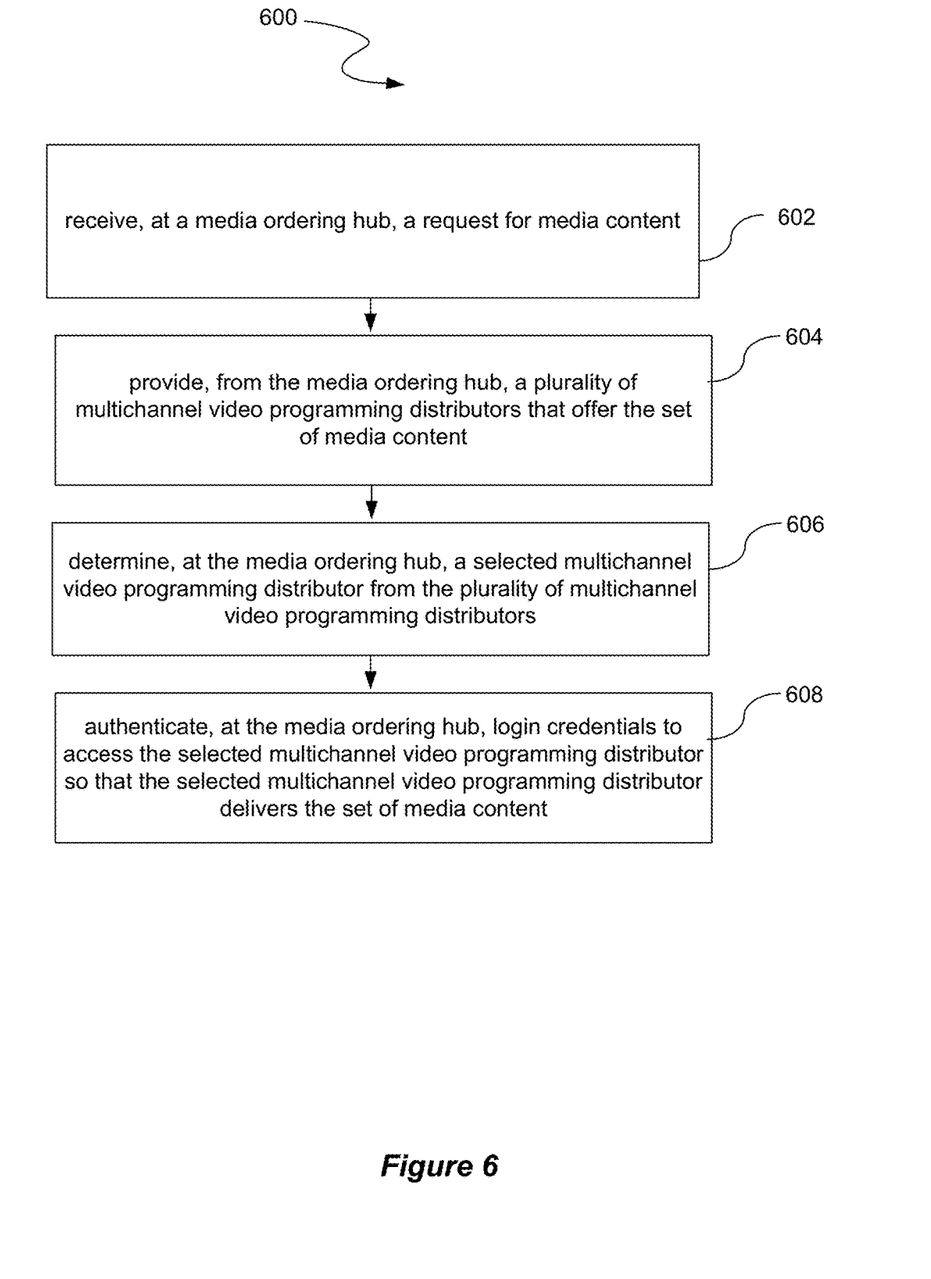
FIG. 6 illustrates a process that may be utilized to provide ordering of media content.

In addition, FIG. 6 illustrates a process 600 that may be utilized to provide ordering of media content. At a process block 602, the process 600 receives, at the media ordering hub 108, a request for media content. Further, at a process block 604, the process 600 provides, from the media ordering hub 108, a plurality of MVPDs that offer the media content. In addition, at a process block 606, the process 600 determines, at the media ordering hub 108, a selected MVPD from the plurality of MVPDs. At a process block 608, the process 600 also authenticates, at the media ordering hub 108, login credentials to access the selected MVPD so that the selected MVPD delivers the media content.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a PC, laptop, smartphone, tablet device, set top box, or the like.

The concepts described herein may be used with or applied to a digital content service. So the term "MVPDs" may refer to or include VOD/Electronic Sell-Through ("EST") Providers or Internet Protocol ("IP")-based providers.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:

receive, at a media ordering hub, a request for playback of first media content that is contextually discovered at a website based upon a current user activity performed through a network on a user device, wherein the website displays content about second media content without playback of the second media content, wherein the first media content is categorized according to a same category as the second media content, wherein the first media content is distinct from the second media content, wherein the contextual discovery comprises a contextual display of information on the user device that is associated with the second media content in conjunction with the current user activity, wherein the contextual discovery is performed by the user device without a user search during the current user activity, the request for the media content being received from a set of embeddable code that streams a preview of the first media content that is contextually discovered to the user device during the current user activity at the website for display at the website, the preview including one or more portions of the first media content that is viewed by the user, the one or more viewed portions being available for selection by the user device for viewing subsequent to the current user activity;

provide, from the media ordering hub, a plurality of indicia corresponding to a plurality of multichannel video programming distributors to the user device based upon the set of embeddable code directing the user device to the media ordering hub from the website after streaming of the preview has been initiated, the plurality of multichannel video programming distributors offering the first media content;

receive, at the media ordering hub, an indication of a multichannel video programming distributor that is selected by a user associated with the user device from the plurality of multichannel video programming distributors; and authenticate, at the media ordering hub, login credentials received from the user device to access the selected multichannel video programming distributor so that the selected multichannel video programming distributor delivers the first media content to the user device without the user device directly accessing a website associated with the selected multichannel video programming distributor, the media ordering hub being an intermediary website that acts as an intermediary between the user device and the website associated with the selected multichannel video programming distributor.

2. The computer program product of claim 1, wherein the set of embeddable code is embedded in a web page.

3. The computer program product of claim 1, wherein the set of embeddable code is embedded in an application.

4. The computer program product of claim 1, wherein the set of embeddable code is embedded in an online advertisement.

5. The computer program product of claim 1, wherein the set of embeddable code is hosted on a remote server.

6. The computer program product of claim 1, wherein the set of embeddable code contextually discovers a potential customer.

7. The computer program product of claim 1, wherein the first media content is purchased prior to delivery via a payment system.

8. The computer program product of claim 1, wherein the payment system accepts a payment from selected from the group consisting of: a credit card payment, a debit card payment, a direct billing to the selected multichannel video programming distributor for subsequent payment, a virtual currency payment, a coupon payment, and a voucher payment.

9. The computer program product of claim 8, wherein the media ordering hub is location aware such that the media ordering hub performs the determination based upon knowledge of the selected multichannel video programming distributor providing media content in a geographic location in which a user is situated.

10. The computer program product of claim 8, wherein the determination is received via a user input.

11. The computer program product of claim 1, wherein a selection of the selected multichannel video programming distributor is based upon a determination of a user subscription to the selected multichannel video programming distributor.

12. The computer program product of claim 1, wherein the set of embeddable code provides a buy indicium that allows the first media content to be purchased.

13. The computer program product of claim 1, wherein the set of embeddable code provides a rent indicium that allows the first media content to be rented.

14. A method comprising:
receiving, at a media ordering hub, a request for playback of first media content that is contextually discovered at a website based upon a current user activity performed through a network on a user device, wherein the website displays content about second media content without playback of the second media content, wherein the first media content is categorized according to a same category as the second media content, wherein the first media content is distinct from the second media content, wherein the contextual discovery comprises a contextual display of information on the user device that is associated with the second media content in conjunction with the current user activity, wherein the contextual discovery is performed by the user device without a user search during the current user activity, the request for the media content being received from a set of embeddable code that streams a preview of the first media content that is contextually discovered to the user device during the current user activity at the website for display at the website, the preview including one or more portions of the first media content that is viewed by the user, the one or more viewed portions being available for selection by the user device for viewing subsequent to the current user activity;
providing, from the media ordering hub, a plurality of indicia corresponding to a plurality of multichannel video programming distributors to the user device based upon the set of embeddable code directing the user device to the media ordering hub from the website after streaming of the preview has been initiated, the plurality of multichannel video programming distributors offering the media content;
receiving, at the media ordering hub, an indication of a multichannel video programming distributor that is selected by a user associated with the user device from the plurality of multichannel video programming distributors; and
authenticating, at the media ordering hub, login credentials received from the user device to access the selected multichannel video programming distributor so that the selected multichannel video programming distributor delivers the first media content to the user device without the user device directly accessing a website associated with the selected multichannel video programming distributor, the media ordering hub being an intermediary website that acts as an intermediary between the user device and the website associated with the selected multichannel video programming distributor.

15. The method of claim 14, wherein the set of embeddable code is embedded in a web page.

16. The method of claim 14, wherein the set of embeddable code is embedded in an application.

17. The method of claim 14, wherein the set of embeddable code is embedded in an online advertisement.

18. The method of claim 14, wherein the set of embeddable code is hosted on a remote server.

19. The method of claim 14, wherein the set of embeddable code contextually discovers a potential customer.

20. A system comprising:
a processor that is configured to receive, at a media ordering hub, a request for playback of first media content that is contextually discovered at a website based upon a current user activity performed through a network on a user device, provide, from the media ordering hub, a plurality of indicia corresponding to a plurality of multichannel video programming distributors to the user device based upon a set of embeddable code directing the user device to the media ordering hub from the website after streaming of a preview has been initiated, receive, at the media ordering hub, indication of a multichannel video programming distributor that is selected by a user associated with the user device from the plurality of multichannel video programming distributors, and authenticate, at the media ordering hub, login credentials received from the user device to access the selected multichannel video programming distributor so that the selected multichannel video programming distributor delivers the first media content to the user device without the user device directly accessing a website associated with the selected multichannel video programming distributor, wherein the website displays content about second media content without playback of the second media content, wherein the first media content is categorized according to a same category as the second media content, wherein the first media content is distinct from the second media content, wherein the preview includes one or more portions of the first media content that is viewed by the user, wherein the one or more viewed portions are available for selection by the user device for viewing subsequent to the current user activity, wherein the contextual discovery comprises a contextual display of information that is associated with the second media content in conjunction with the current user activity, wherein the contextual discovery is performed by the user device without a user search during the current user activity, wherein the plurality of multichannel video programming distributors offer the first media content, the request for the first media content being received from the set of embeddable code that streams the preview of the first media content that is contextually discovered to the user device during the current user activity at the website for display at the website, the media ordering hub being an intermediary website that acts as an intermediary between the user device and the website associated with the selected multichannel video programming distributor.

\* \* \* \* \*